US010440245B1

(12) United States Patent
Johnson et al.

(10) Patent No.: US 10,440,245 B1
(45) Date of Patent: Oct. 8, 2019

(54) OVEN APPLIANCE CAMERA ASSEMBLY INCLUDING A LIGHT SHIELD

(71) Applicant: Haier US Appliance Solutions, Inc., Wilmington, DE (US)

(72) Inventors: Eric Scott Johnson, Louisville, KY (US); Hans Juergen Paller, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 15/968,797

(22) Filed: May 2, 2018

(51) Int. Cl.
*H04N 5/225* (2006.01)
*F24C 15/04* (2006.01)
*F24C 15/00* (2006.01)

(52) U.S. Cl.
CPC ......... *H04N 5/2254* (2013.01); *F24C 15/006* (2013.01); *F24C 15/04* (2013.01); *H04N 5/2252* (2013.01); *H04N 5/22521* (2018.08)

(58) Field of Classification Search
CPC ............... H04N 5/2251; H04N 5/2252; H04N 5/22521; H04N 5/2253; H04N 5/2254; H05K 5/00; H05K 5/02; H05K 5/0213; H05K 5/0217; H05K 5/0239; H05K 7/00; H05K 7/14; H05K 7/20; H05K 7/20009–7/20209; F24C 15/028; F24C 15/04; F24C 15/006; F27D 21/02; F27D 2021/026; F27D 2099/0085
See application file for complete search history.

(56) References Cited

U.S. PATENT DOCUMENTS

| 9,615,007 B2 | 4/2017 | Pfaffinger, Jr. et al. |
| 9,982,895 B2 * | 5/2018 | Ruther ..................... A21B 3/02 |
| 2014/0048055 A1 | 2/2014 | Ruther |
| 2017/0188416 A1 | 6/2017 | Beifuss et al. |
| 2017/0208652 A1 * | 7/2017 | Luckhardt ............... F24C 7/085 |
| 2018/0372326 A1 * | 12/2018 | Park ................... H04M 1/72533 |

FOREIGN PATENT DOCUMENTS

| CN | 205181115 U | 4/2016 |
| EP | 2515044 A1 * | 10/2012 ............. F24C 7/085 |

* cited by examiner

*Primary Examiner* — Lin Ye
*Assistant Examiner* — Chriss S Yoder, III
(74) *Attorney, Agent, or Firm* — Dority & Manning, P.A.

(57) ABSTRACT

A door assembly for providing selective access to a cooking chamber of an oven appliance includes an inner glass assembly and an outer glass assembly spaced apart by an outer air gap. A mounting bracket is positioned within the outer air gap and a camera is mounted to the mounting bracket. The door assembly further includes a primary light shield, which may be an extension of the mounting bracket or a non-reflective coating on the outer glass assembly, which blocks reflected light from reaching the camera. In addition, the inner glass assembly may include an inner glass pane and a middle glass pane separated by an inner air gap, and a secondary light shield may be positioned within the inner air gap to block more reflected light.

20 Claims, 5 Drawing Sheets

OVEN APPLIANCE CAMERA ASSEMBLY INCLUDING A LIGHT SHIELD

FIELD OF THE INVENTION

The present subject matter relates generally to oven appliances, and more particularly, to door and camera assemblies for oven appliances.

BACKGROUND OF THE INVENTION

Conventional residential and commercial oven appliances generally include a cabinet that includes a cooking chamber for receipt of food items for cooking. Multiple heating elements are positioned within the cooking chamber to provide heat to food items located therein. The heating elements can include, for example, radiant heating elements, such as a bake heating assembly positioned at a bottom of the cooking chamber and/or a separate broiler heating assembly positioned at a top of the cooking chamber.

Notably, it is desirable to provide a camera for generating images of food during a cooking process, e.g., to monitoring cooking progress. However, conventional cameras are positioned outside of the cooking chamber to ensure a safe operating temperature. Thus, cameras view the cooking chamber through one or more layers of glass. Light from inside or outside of the cooking chamber may reflect off this glass and result in reduced image quality, particularly when the glass is coated with materials to reflect infrared radiation.

Accordingly, an oven appliance that includes an improved camera assembly would be useful. More particularly, an oven appliance with a camera assembly that provides improved image quality with no interference from undesirably reflected light would be particularly beneficial.

BRIEF DESCRIPTION OF THE INVENTION

Aspects and advantages of the invention will be set forth in part in the following description, or may be apparent from the description, or may be learned through practice of the invention.

In a first example embodiment, an oven appliance defining a vertical, a lateral, and a transverse direction is provided. The oven appliance includes a cabinet, a cooking chamber positioned within the cabinet, and a door rotatably mounted to the cabinet for providing selective access to the cooking chamber, the door including an inner glass assembly and an outer glass assembly. A camera assembly includes a mounting bracket positioned between the inner glass assembly and the outer glass assembly, a camera mounted to the mounting bracket and comprising a lens, and a primary light shield positioned proximate the camera and at least partially surrounding the camera to block reflected light from reaching the lens of the camera.

In a second example embodiment, a door assembly for providing selective access to a cooking chamber of an oven appliance is provided. The door assembly includes an inner glass assembly comprising an inner glass pane and an outer glass assembly spaced apart from the inner glass assembly to define an outer air gap. A mounting bracket is positioned within the outer air gap and defines a lens aperture, and a camera is mounted to the mounting bracket and includes a lens positioned within the lens aperture. A primary light shield extends from the mounting bracket and at least partially surrounds the camera to block reflected light from reaching the lens of the camera.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
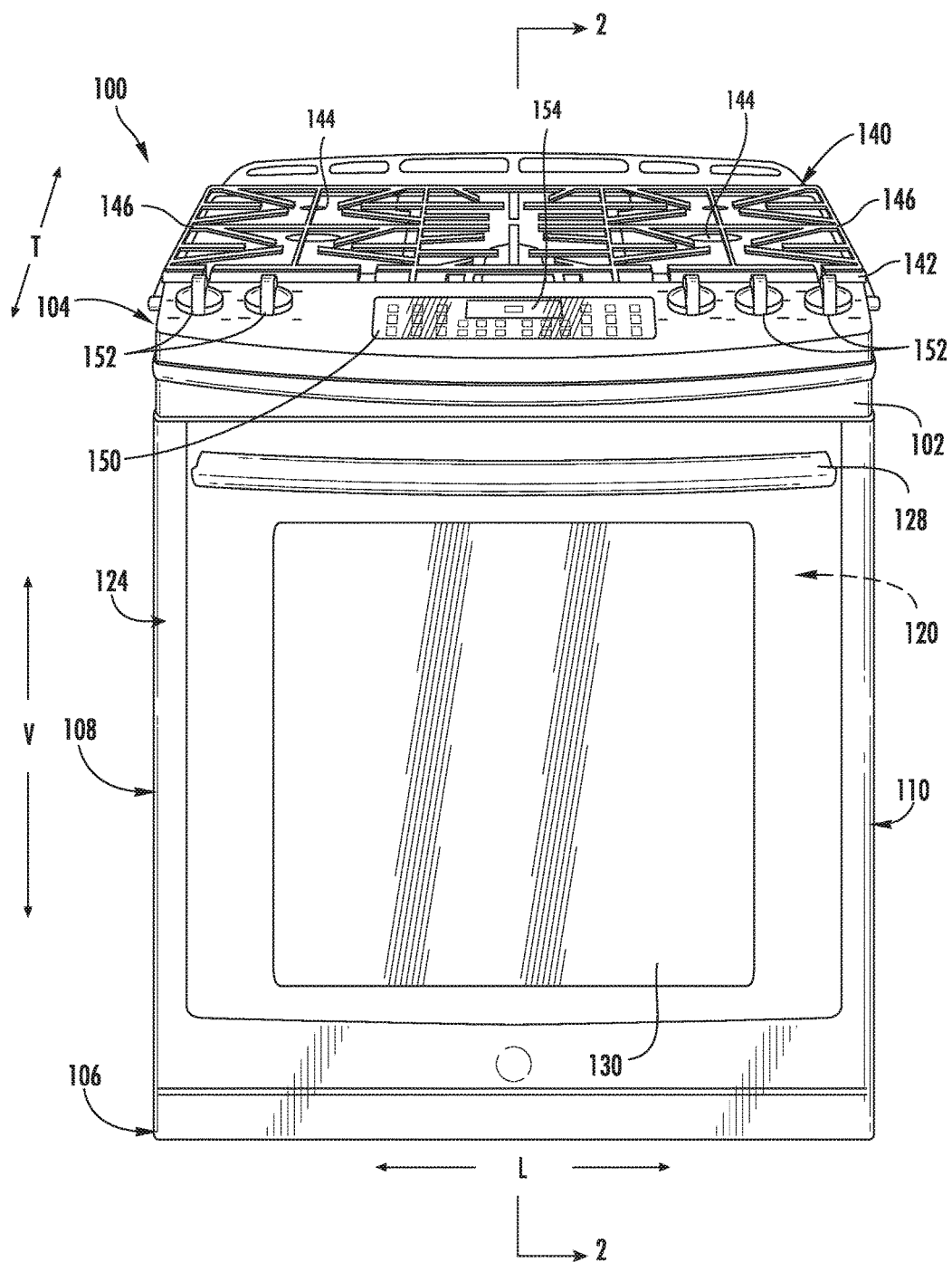
FIG. 1 is a front, perspective view of an oven appliance according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a front, perspective view of an oven appliance 100 as may be employed with the present subject matter. Oven appliance 100 generally defines a vertical direction V, a lateral direction L, and a transverse direction T, each of which is mutually perpendicular, such that an orthogonal coordinate system is generally defined. As illustrated, oven appliance 100 includes an insulated cabinet 102. Cabinet 102 of oven appliance 100 extends between a top 104 and a bottom 106 along the vertical direction V, between a first side 108 (left side when viewed from front) and a second side 110 (right side when viewed from front) along the lateral direction L, and between a front 112 and a rear 114 along the transverse direction T.

Within cabinet 102 is a single cooking chamber 120 which is configured for the receipt of one or more food items to be cooked. However, it should be appreciated that oven appliance 100 is provided by way of example only, and aspects of the present subject matter may be used in any suitable cooking appliance, such as a gas or electric double oven range appliance. Thus, the example embodiment shown in FIG. 1 is not intended to limit the present subject matter to any particular cooking chamber configuration or arrangement.

Oven appliance 100 includes a door assembly 124 rotatably attached to cabinet 102 in order to permit selective access to cooking chamber 120. Handle 128 is mounted to door assembly 124 to assist a user with opening and closing door assembly 124 in order to access cooking chamber 120. As an example, a user can pull on handle 128 mounted to door assembly 124 to open or close door assembly 124 and access cooking chamber 120. As explained in detail below, one or more transparent viewing windows 130 (FIG. 1) may be defined within door assembly 124 to provide for viewing the contents of cooking chamber 120 when door assembly 124 is closed and also assist with insulating cooking chamber 120.

Oven appliance may further include one or more heating elements (not shown) positioned within cabinet 102 for selectively heating cooking chamber 120. For example, the heating elements may be electric resistance heating elements, gas burners, microwave heating elements, halogen heating elements, or suitable combinations thereof. According to an exemplary embodiment, oven appliance 100 is a self-cleaning oven. In this regard, the heating elements may be configured for heating cooking chamber 120 to a very high temperature (e.g., 800° F. or higher) in order to burn off any food residue or otherwise clean cooking chamber 120.

Oven appliance 100 also includes a cooktop 140. Cooktop 140 is positioned at or adjacent top 104 of cabinet 102. Thus, cooktop 140 is positioned above cooking chamber 120. Cooktop 140 includes a top panel 142 positioned proximate top 104 of cabinet 102. By way of example, top panel 142 may be constructed of glass, ceramics, enameled steel, and combinations thereof. A plurality of burner assemblies 144 are mounted within or on top of top panel 142. Oven appliance 100 may include one or more grates 146 configured to support cooking utensils, such as pots or pans, over burner assemblies 144.

Grates 146 are supported on a top surface of top panel 142 such that burner assemblies 144 provide thermal energy to cooking utensils positioned thereon, e.g., to heat food and/or cooking liquids (e.g., oil, water, etc.). As shown in FIG. 1, burners assemblies 144 can be configured in various sizes so as to provide e.g., for the receipt of cooking utensils (i.e., pots, pans, etc.) of various sizes and configurations and to provide different heat inputs for such cooking utensils. According to alternative embodiments, oven appliance 100 may have other cooktop configurations or burner elements. For example, cooktop 140 could alternatively include electric burners, induction burners, or any other suitable type and configuration of heating element.

A user interface panel 150 is located within convenient reach of a user of the oven appliance 100. For this example embodiment, user interface panel 150 includes knobs 152 that are each associated with one of burner assemblies 144. In this manner, knobs 152 allow the user to activate each burner assembly 144 and determine the amount of heat input provided by each burner assembly 144 to a cooking utensil located thereon. Although shown with knobs 152, it should be understood that knobs 152 and the configuration of oven appliance 100 shown in FIG. 1 is provided by way of example only. More specifically, user interface panel 150 may include various input components, such as one or more of a variety of touch-type controls, electrical, mechanical or electro-mechanical input devices including rotary dials, push buttons, and touch pads. User interface panel 150 may also be provided with one or more graphical display devices or display components 154, such as a digital or analog display device designed to provide operational feedback or other information to the user such as e.g., whether a particular burner assembly is activated and/or the rate at which the burner assembly is set.

Although aspects of the present subject matter are described herein in the context of a single oven appliance, it should be appreciated that oven appliance 100 is provided by way of example only. Other oven or range appliances having different configurations, different appearances, and/or different features may also be utilized with the present subject matter, e.g., double ovens, electric cooktop ovens, induction cooktops ovens, etc. Moreover, aspects of the present subject matter may be used in any other consumer or commercial appliance where it is desirable to use a camera within another suitable appliance.

In general, cooking chamber 120 is defined by a plurality of chamber walls (not shown). Specifically, cooking chamber 120 may be defined by a top wall, a rear wall, a bottom wall, and two sidewalls. These chamber walls may be joined together to define an opening through which a user may selectively access cooking chamber 120 by opening door assembly 124. In order to insulate cooking chamber 120, oven appliance 100 includes an insulating gap defined between the chamber walls and cabinet 102. According to an exemplary embodiment, the insulation gap is filled with insulating material, such as insulating foam or fiberglass, for insulating cooking chamber 120.

Referring now to FIGS. 2 through 6, door assembly 124 will be described in more detail according to exemplary embodiments of the present subject matter. More specifically, according to exemplary embodiments, oven appliance 100 may include a camera assembly 160 which is positioned within door assembly 124 and is generally configured for providing images of food items that are cooking within cooking chamber 120. In this regard, for example, camera assembly 160 includes a camera 162 having a lens 164 that is configured for taking still images or video and transmitting those images to a user to provide feedback regarding the cooking process. For example, camera 162 can provide a live image or video to display 154 (FIG. 1) upon user request. According to still other embodiments, camera 162 may be a thermal imaging device or any other device for providing the user with feedback regarding the food items being cooked within cooking chamber 120.

Notably, installing a camera in a cooking appliance where it may be exposed to high temperatures can result in operability issues or poor image quality. For example, conventional cameras are positioned outside of the cooking chamber to ensure a safe operating temperature and therefore typically have a lens directed through one or more layers of glass. Light from inside or outside of the cooking chamber may reflect off this glass and result in reduced image quality, particularly when the glass is coated with materials to reflect infrared radiation. Therefore, aspects of the present subject matter are directed to features of door assembly 124 and camera assembly 160 which permit safe operation of camera 162 while ensuring improved image quality.

Figure 2:
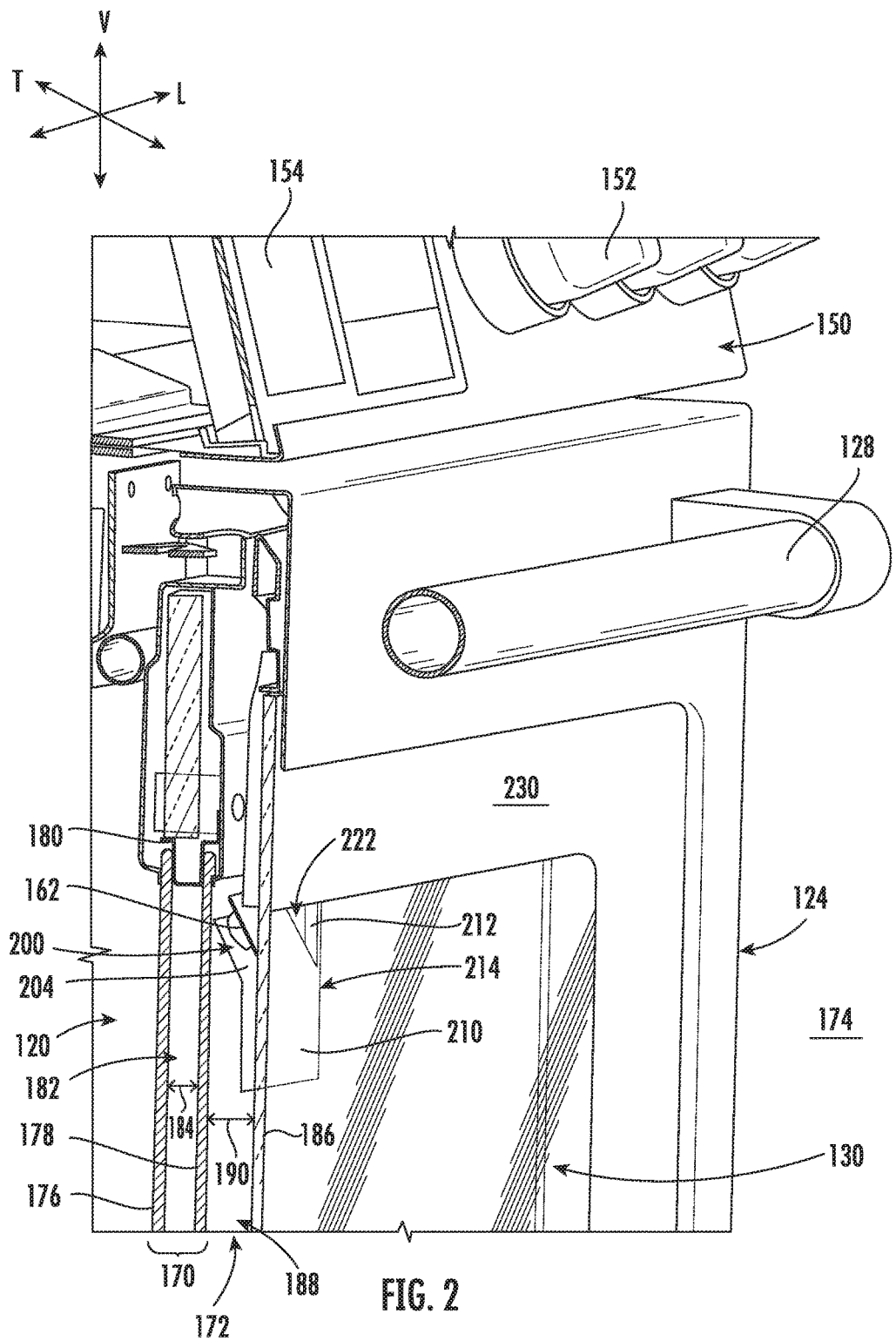
FIG. 2 is a close-up cross sectional view of the exemplary oven appliance of FIG. 1, taken along Line 2-2 in FIG. 1.
Figure 3:
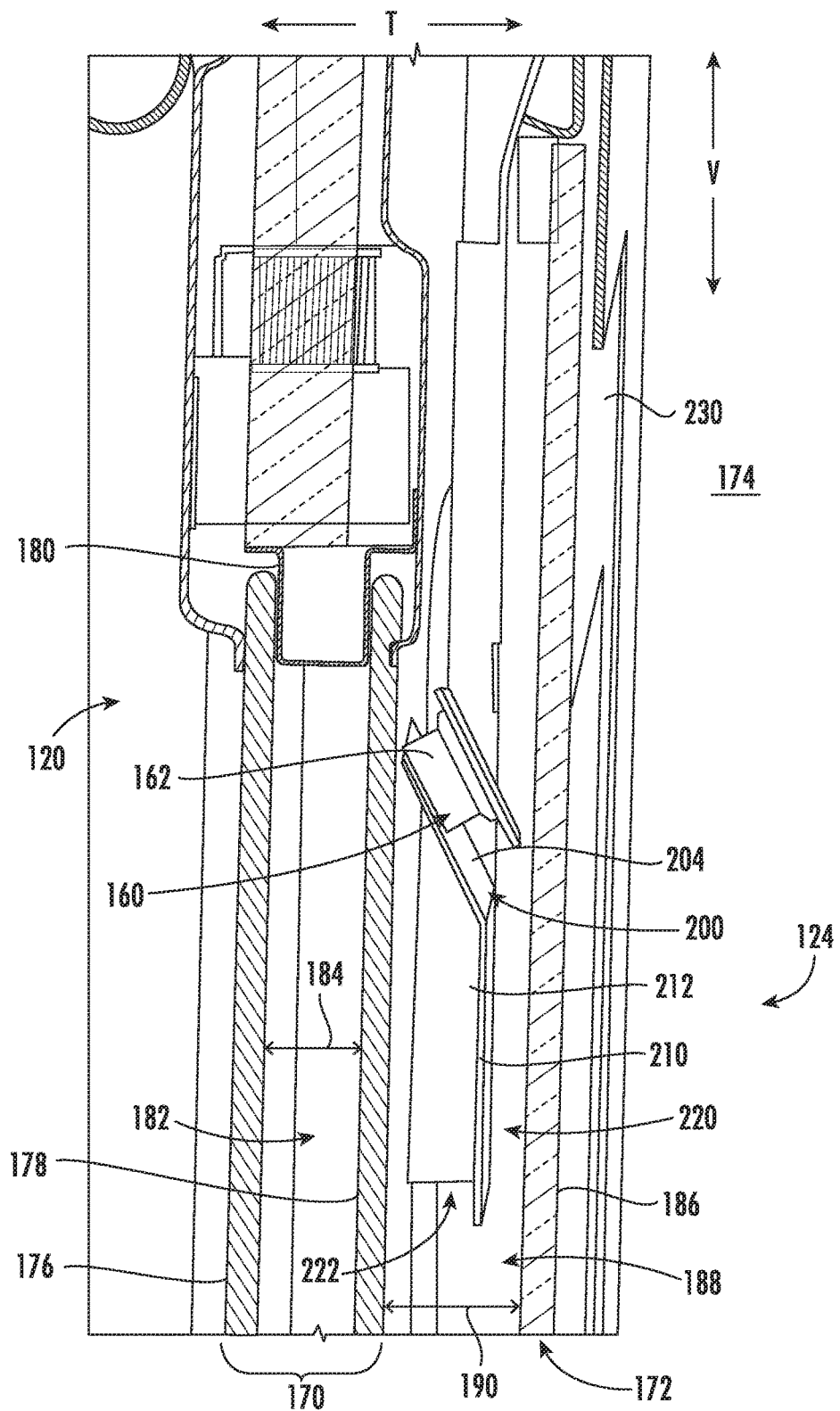
FIG. 3 is side cross sectional view of the exemplary oven appliance of FIG. 1.
Figure 4:
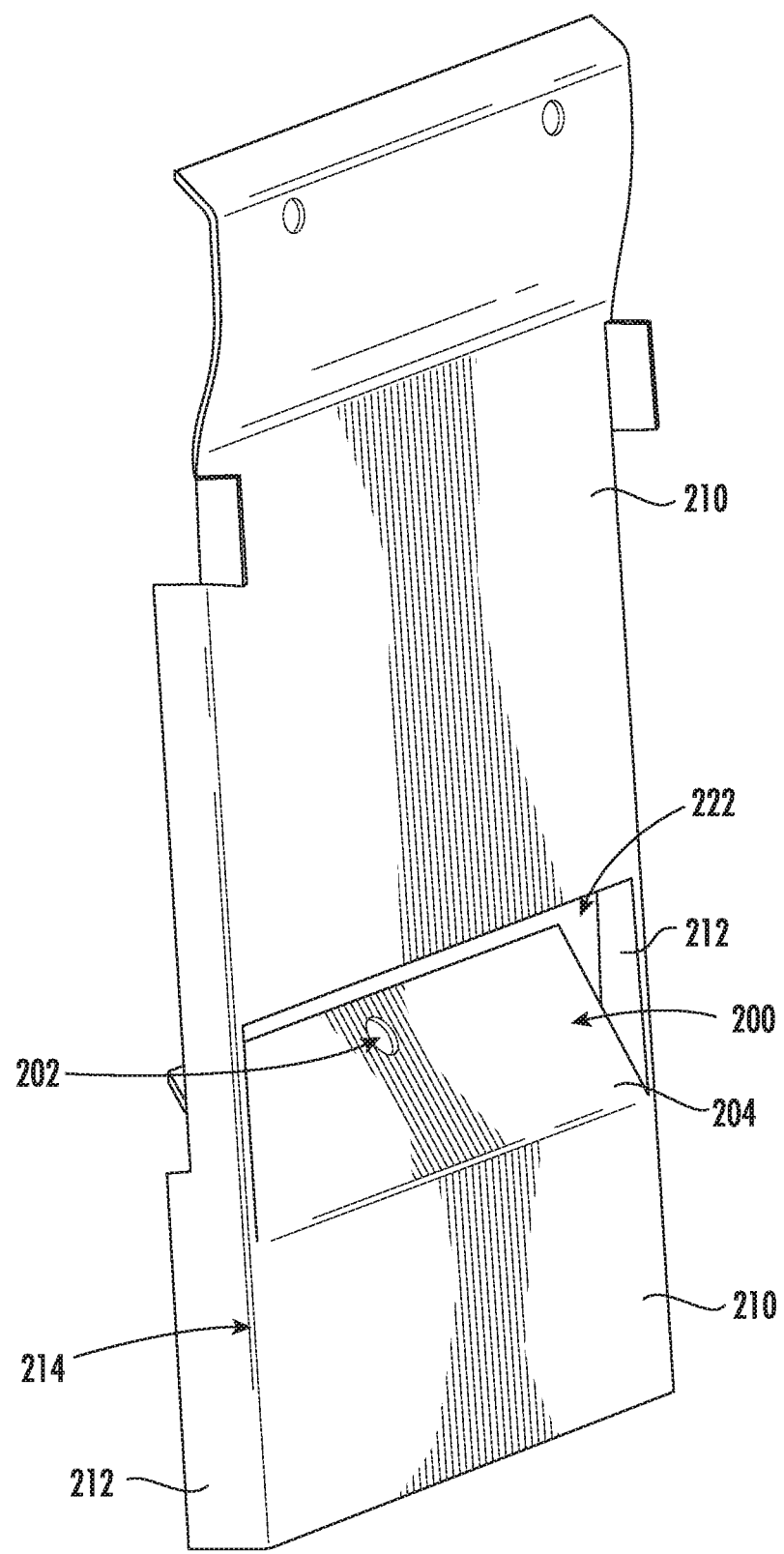
FIG. 4 is a perspective view of a camera mounting bracket and a light shield of the exemplary oven appliance of FIG. 1 according to an exemplary embodiment of the present subject matter.
Figure 5:
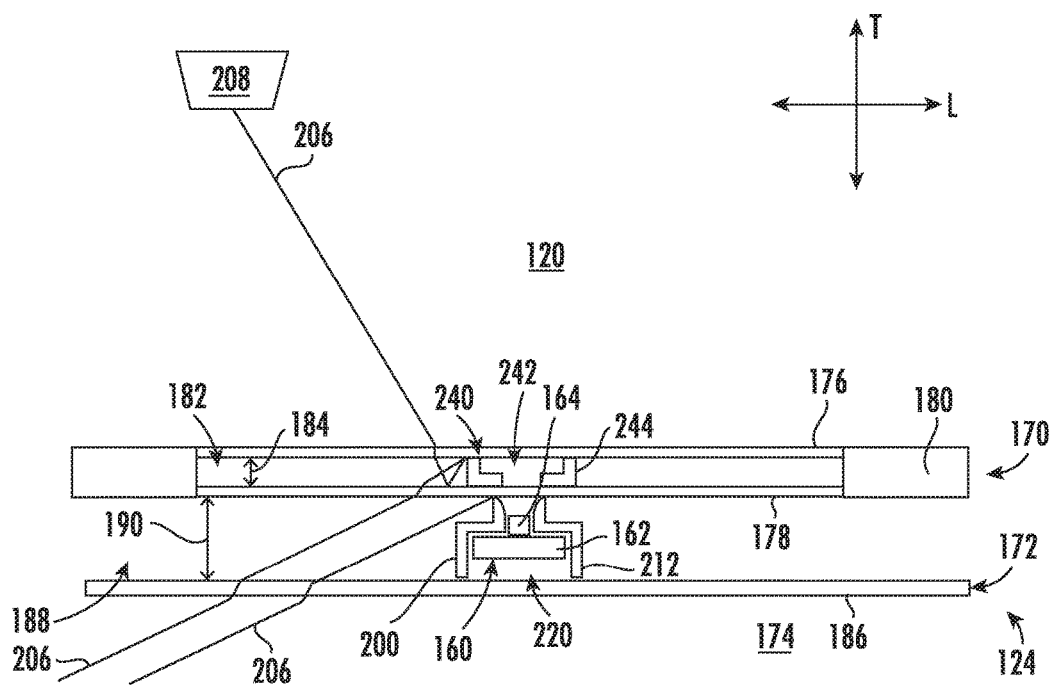
FIG. 5 provides a top schematic view of an oven door including the exemplary camera mounting bracket and light guide of FIG. 4 with light directed from inside and outside of the cooking chamber.

As best shown in FIGS. 2, 3, and 5, door assembly 124 generally includes an inner glass assembly 170 positioned proximate cooking chamber 120 and an outer glass assembly 172 positioned proximate an ambient environment 174 (e.g., outside of oven appliance 100). In general, each of inner glass assembly 170 and outer glass assembly 172 may include one or more transparent windows (such as window 130). Although these windows are referred to herein as glass panes, it should be appreciated that these transparent windows may be constructed of any suitably rigid and temperature resistant material, e.g., such as acrylic glass or Plexiglass.

Specifically, according to the illustrated embodiment, inner glass assembly 170 includes an inner glass pane 176 (which is closest to or faces cooking chamber 120) and a middle glass pane 178. A spacer bracket 180 is positioned between inner glass pane 176 and middle glass pane 178 to maintain a gap between the two glass panes. Specifically, inner glass pane 176 and middle glass pane 178 are separated by an inner air gap 182 along the transverse direction T (e.g., when door assembly 124 is closed). In general, inner air gap 182 defines an inner gap width 184 which generally insulates cooking chamber 120 and provides a conductive thermal break between the hot air within cooking chamber 120 and camera assembly 160 (and the ambient environment 174). Although inner glass assembly 170 is illustrated herein as having two glass panes, it should be appreciated that a single glass pane may be used according to alternative embodiments.

As illustrated, outer glass assembly 172 includes a single outer glass pane 186. Outer glass assembly 172 (i.e., outer glass pane 186) is separated from inner glass assembly 170 by an outer air gap 188 which is defined along the transverse direction T (i.e., when door assembly 120 is closed). Outer air gap 188 generally defines an outer gap with 190 along the transverse direction T. Although outer glass assembly 172 is illustrated as including a single outer glass pane 186, it should be appreciated that any suitable number of transparent windows formed from any suitable material may be used according to alternative embodiments.

Referring again generally to FIGS. 2 through 6, door assembly 124, or more specifically camera assembly 160, includes a mounting bracket 200 positioned within outer air gap 188 between inner glass assembly 170 and outer glass assembly 172. In general, mounting bracket 200 is configured for receiving camera 162 and may define a lens aperture 202 that surrounds lens 164 of camera 162. Specifically, according to the illustrated embodiment, mounting bracket 200 defines an angled panel 204 that is formed to aim lens 164 toward a center of cooking chamber 120. It should be appreciated that panel 204 need not be angled according to alternative embodiments. Thus, according to the illustrated embodiment, camera mounting bracket 200 is positioned between middle glass pane 178 and outer glass pane 186. In addition, mounting bracket 200 is positioned proximate a top center of door assembly 124, i.e., along the vertical direction V in the lateral direction L, respectively.

According to an exemplary embodiments, glass panes or transparent windows are configured for stopping large portions of radiant energy. However, at least a portion of the visible light (identified by arrows 206 in FIG. 5) passes through the glass panes and a portion is reflected by the glass panes (or coatings on the glass panes). For example, as illustrated, oven appliance 100 further includes a lamp 208 positioned proximate a top of cooking chamber 120 which illuminates food for improved viewing during a cooking process. Thus, light 206 both from within cooking chamber 120 and from ambient environment 174 may have a tendency to reflect off the glass panes and affect image quality.

In order to prevent reflected light from reaching lens 164 and generally improving the image quality generated by camera 162, door assembly 124 and camera assembly 160 may further include features for blocking or substantially attenuating the amount of reflected light that reaches lens 164. For example, camera assembly 160 may include a primary light shield 210 which is positioned proximate camera 162 and at least partially surrounds camera 162 to block reflected light from reaching lens 164.

Depending on the angle and brightness of light 206 primary light shield 210 may have a different size and geometry in order to block the light path from the light source to lens 164. For example, light 206 from lamp 208 may be substantially directional and may be blocked by a relatively small but precisely positioned shield. By contrast light 206 from the ambient environment 174 may be bright and pass through inner glass assembly 170 or outer glass assembly 172 from many directions. Therefore, blocking light 206 from the ambient environment 174 may require a larger or more enclosed shield.

According to the illustrated exemplary embodiment, primary light shield 210 extends from mounting bracket 200 away from camera 162 substantially within a plane defined perpendicular to the transverse direction T. It should be appreciated that as used herein, terms of approximation, such as "approximately," "substantially," or "about," refer to being within a ten percent margin of error. In addition, primary light shield 210 may define one or more flanges 212 that extend from a perimeter 214 of primary light shield 210 substantially along the transverse direction T. In this regard, as illustrated, primary light shield 210 defines two vertically extending flanges 212 positioned on the lateral sides of primary light shield 210. According to the illustrated embodiment, flanges 212 extend only partially across outer air gap 188, e.g., to block light while permitting air to circulate and cool camera 162. Specifically, as best shown in FIG. 3, flange 212 extends along the transverse direction T along greater than 50% of outer gap width 190, though any other suitable depth of flanges 212 may be used according to alternative embodiments.

Notably, according to the illustrated embodiment, mounting bracket 200 and primary light shield 210 are formed from a single piece of material. More specifically, for example, mounting bracket 200 and primary light shield 210 are stamped from a single piece of sheet metal, though other constructions and materials are possible according to alternative embodiments. It is often desirable to have non-reflective coatings on light shields to reduce reflections off those light shields. In this regard, according to exemplary embodiments, at least one of mounting bracket 200, primary light shield 210, or other light shields described herein may comprise a dark matte finish to reduce glare and reflections. For example, mounting bracket 200 and primary light shield 210 may be painted with a non-reflective, flat black paint or any other suitable dark finish. Alternatively, a glossy dark finish or any other suitable non-reflective finish may be used.

Notably, excessive heat within outer air gap 188 may damage camera 162 and/or lens 164. Therefore, mounting bracket 200 and primary light shield 210 may include features for facilitating cooling of camera 162. Specifically, according to the illustrated embodiment, mounting bracket 200 and primary light shield 210 may include openings to define a cooling pathway 220 through which air within outer air gap 188 may circulate to cool camera 162 during operation. In this regard, for example, mounting bracket 200 and primary light shield 210 do not extend across the entire outer air gap 188 and define airflow openings 222 to permit air to circulate therein.

Although primary light shield 210 is described above as being formed integrally with and extending from mounting bracket 200 within outer air gap 188, it should be appreciated that according to alternative embodiments primary light shield 210 may be any other feature defined on door assembly 124 which blocks light 206 from reaching camera 162. In this regard, for example, according to alternative embodiments primary light shield 210 may comprise a non-reflective coating (similar to coating 230 illustrated in FIGS. 1 and 2) which is opaque and prevents visible light 206 from passing through. Such a non-reflective coating 230 may be sprayed or deposited on inner glass assembly 170, outer glass assembly 172, or both. In addition, coating 230 could replace primary light shield 210 according to exemplary embodiments.

Figure 6:
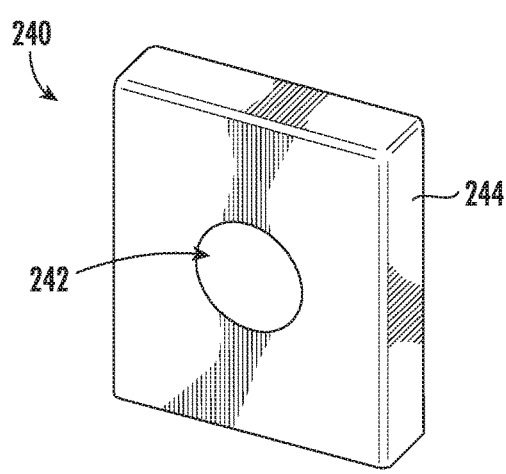
FIG. 6 provides a perspective view of a second light shield of the exemplary oven appliance of FIG. 1 according to an exemplary embodiment of the present subject matter.

Referring now specifically to FIGS. 5 and 6, door assembly 124 and camera assembly 160 may further include a secondary light shield 240 that is positioned within inner air gap 182 (i.e., between inner glass pane 176 and middle glass pane 178). Secondary light shield is positioned proximate camera 162 and may define a central aperture 242 through which lens 164 is aimed. In addition, because the flow of cooling air is less relevant within inner air gap 182, secondary light shield 240 may define a perimeter flange 244 that extends substantially along the transverse direction T across the entire inner gap width 184. In general, as shown in FIG. 5, primary light shield 210 may be configured for blocking light 206 from the ambient environment 174, while secondary light shield 240 may be configured for blocking light 206 from the ambient environment 174 and light from within cooking chamber 120 (e.g., from lamp 208).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An oven appliance defining a vertical, a lateral, and a transverse direction, the oven appliance comprising:
    a cabinet;
    a cooking chamber positioned within the cabinet;
    a door rotatably mounted to the cabinet for providing selective access to the cooking chamber, the door comprising an inner glass assembly and an outer glass assembly; and
    a camera assembly comprising:
        a mounting bracket positioned between the inner glass assembly and the outer glass assembly;
        a camera mounted to the mounting bracket and comprising a lens; and
        a primary light shield positioned proximate the camera and at least partially surrounding the camera to block reflected light from reaching the lens of the camera.

2. The oven appliance of claim 1, wherein the primary light shield extends from the mounting bracket away from the camera substantially within a plane defined perpendicular to the transverse direction.

3. The oven appliance of claim 2, wherein the primary light shield defines one or more flanges extending from a perimeter of the primary light shield substantially along the transverse direction.

4. The oven appliance of claim 3, wherein an outer air gap is defined between the inner glass assembly and the outer glass assembly, the outer air gap defining an outer gap width along the transverse direction, and wherein the one or more flanges extend along greater than 50% of the outer gap width.

5. The oven appliance of claim 2, wherein the mounting bracket and the primary light shield define a cooling pathway to permit air to circulate past the camera.

6. The oven appliance of claim 2, wherein the mounting bracket and the primary light shield are formed from a single piece of material.

7. The oven appliance of claim 1, wherein the mounting bracket comprises a panel defining a lens aperture that surrounds the lens.

8. The oven appliance of claim 1, wherein the inner glass assembly comprises an inner glass pane spaced apart from a middle glass pane by an inner air gap.

9. The oven appliance of claim 8, wherein a secondary light shield is positioned within the inner air gap, the secondary light shield being positioned proximate the camera for blocking reflected light from reaching the lens.

10. The oven appliance of claim 9, wherein the inner air gap defines an inner gap width, and wherein the secondary light shield defines a central aperture and a perimeter flange that extends substantially along the transverse direction for a majority of the inner gap width.

11. The oven appliance of claim 9, wherein the camera mounting bracket is positioned between the middle glass pane and the outer glass assembly adjacent the secondary light shield.

12. The oven appliance of claim 1, wherein the primary light shield comprises a non-reflective coating defined on at least one of the inner glass assembly and the outer glass assembly.

13. The oven appliance of claim 1, wherein at least one of the mounting bracket and the primary light shield comprises a dark finish to reduce glare.

14. The oven appliance of claim 1, wherein the camera is mounted proximate a top center of the door and is angled toward a center of the cooking chamber.

15. A door assembly for providing selective access to a cooking chamber of an oven appliance, the door assembly comprising:
    an inner glass assembly comprising an inner glass pane;
    an outer glass assembly spaced apart from the inner glass assembly to define an outer air gap;
    a mounting bracket positioned within the outer air gap and defining a lens aperture;
    a camera mounted to the mounting bracket and comprising a lens positioned within the lens aperture; and
    a primary light shield extending from the mounting bracket and at least partially surrounding the camera to block reflected light from reaching the lens of the camera.

16. The door assembly of claim 15, wherein the primary light shield defines one or more flanges extending from a perimeter of the primary light shield substantially along a transverse direction.

17. The door assembly of claim 15, wherein the mounting bracket and the primary light shield define a cooling pathway to permit air to circulate past the camera.

18. The door assembly of claim 15, wherein the primary light shield comprises a non-reflective coating defined on at least one of the inner glass assembly and the outer glass assembly.

19. The door assembly of claim 15, wherein the inner glass assembly comprises a middle glass pane spaced apart from the inner glass pane by an inner air gap, and wherein a secondary light shield is positioned within the inner air gap, the secondary light shield being positioned proximate the camera for blocking reflected light from reaching the lens.

20. The door assembly of claim 19, wherein at least one of the mounting bracket, the primary light shield, and the secondary light shield comprises a dark finish to reduce glare.

\* \* \* \* \*